(12) United States Patent
Davis

(10) Patent No.: US 9,118,618 B2
(45) Date of Patent: Aug. 25, 2015

(54) HARDWARE-BASED PACKET EDITOR

(75) Inventor: Ian E. Davis, Fremont, CA (US)

(73) Assignee: A10 Networks, Inc., San Jose, CA (US)

( * ) Notice: Subject to any disclaimer, the term of this patent is extended or adjusted under 35 U.S.C. 154(b) by 735 days.

(21) Appl. No.: 13/433,290

(22) Filed: Mar. 29, 2012

(65) Prior Publication Data

US 2013/0262702 A1    Oct. 3, 2013

(51) Int. Cl.
*G06F 15/16* (2006.01)
*H04L 29/08* (2006.01)

(52) U.S. Cl.
CPC ..................................... *H04L 67/02* (2013.01)

(58) Field of Classification Search
CPC . H04L 67/02; H04L 67/2804; H04L 67/2842; G06F 15/16
USPC ................................................. 709/200, 246
See application file for complete search history.

(56) References Cited

U.S. PATENT DOCUMENTS

| | | | |
|---|---|---|---|
| 5,432,908 A | 7/1995 | Heddes et al. | |
| 5,875,185 A | 2/1999 | Wang et al. | |
| 6,141,749 A | 10/2000 | Coss et al. | |
| 6,167,428 A | 12/2000 | Ellis | |
| 6,324,286 B1 | 11/2001 | Lai et al. | |
| 6,360,265 B1 | 3/2002 | Falck et al. | |
| 6,363,075 B1 | 3/2002 | Huang et al. | |
| 6,389,462 B1 | 5/2002 | Cohen et al. | |
| 6,415,329 B1 | 7/2002 | Gelman et al. | |
| 6,519,243 B1 | 2/2003 | Nonaka et al. | |
| 6,535,516 B1 | 3/2003 | Leu et al. | |
| 6,658,114 B1 | 12/2003 | Farn et al. | |
| 6,832,322 B1 | 12/2004 | Boden et al. | |
| 7,013,338 B1 | 3/2006 | Nag et al. | |
| 7,058,789 B2 * | 6/2006 | Henderson et al. | ........... 711/220 |
| 7,086,086 B2 | 8/2006 | Ellis | |
| 7,111,162 B1 | 9/2006 | Bagepalli et al. | |
| 7,266,604 B1 | 9/2007 | Nathan et al. | |
| 7,284,272 B2 | 10/2007 | Howard et al. | |

(Continued)

FOREIGN PATENT DOCUMENTS

| | | |
|---|---|---|
| CN | 1921457 | 2/2007 |
| CN | 1937591 | 3/2007 |

(Continued)

OTHER PUBLICATIONS

Chiussi et al., "A Network Architecture for MPLS-Based Micro-Mobility", IEEE WCNC 02, Orlando, Mar 2002.

(Continued)

*Primary Examiner* — Anthony Mejia
(74) *Attorney, Agent, or Firm* — Carr & Ferrell LLP

(57) ABSTRACT

Hardware-based packet editor receives a packet editing script which includes script entries indicating modifications to a data packet and a data block with data for the modified data packet. For a script entry in the packet editing script, the packet editor copies data in the data block at a block location and with a block length identified in the script entry into a packet buffer. The packet editor repeats the copying for the remaining script entries for the modified data packet. The packet editor then generates the modified data packet with the data in the packet buffer. The packet editing script is generated such that a script entry is created for data to be included in the modified data packet and data to be inserted into the modified data packet. Creation of a script entry is omitted for data to be removed.

21 Claims, 8 Drawing Sheets

(56) References Cited

U.S. PATENT DOCUMENTS

| | | | |
|---|---|---|---|
| 7,290,050 B1 | 10/2007 | Smith et al. | |
| 7,308,710 B2 | 12/2007 | Yarborough | |
| 7,406,709 B2 | 7/2008 | Maher, III et al. | |
| 7,441,270 B1 | 10/2008 | Edwards et al. | |
| 7,451,312 B2 | 11/2008 | Medvinsky et al. | |
| 7,516,485 B1 | 4/2009 | Lee et al. | |
| 7,529,242 B1 | 5/2009 | Lyle | |
| 7,568,041 B1 | 7/2009 | Turner et al. | |
| 7,583,668 B1 | 9/2009 | Mayes et al. | |
| 7,591,001 B2 | 9/2009 | Shay | |
| 7,603,454 B2 | 10/2009 | Piper | |
| 7,716,369 B2 | 5/2010 | Le Pennec et al. | |
| 7,779,130 B1 | 8/2010 | Toutonghi | |
| 7,908,651 B2 | 3/2011 | Maher | |
| 8,079,077 B2 | 12/2011 | Chen et al. | |
| 8,244,876 B2 | 8/2012 | Sollee | |
| 8,255,644 B2 * | 8/2012 | Sonnier et al. | 711/154 |
| 8,291,487 B1 | 10/2012 | Chen et al. | |
| 8,332,925 B2 | 12/2012 | Chen et al. | |
| 8,347,392 B2 | 1/2013 | Chess et al. | |
| 8,387,128 B1 | 2/2013 | Chen et al. | |
| 8,464,333 B1 | 6/2013 | Chen et al. | |
| 8,520,615 B2 | 8/2013 | Mehta et al. | |
| 8,595,383 B2 | 11/2013 | Chen et al. | |
| 8,595,819 B1 | 11/2013 | Chen et al. | |
| 8,904,512 B1 | 12/2014 | Chen et al. | |
| 8,914,871 B1 | 12/2014 | Chen et al. | |
| 8,918,857 B1 | 12/2014 | Chen et al. | |
| 8,943,577 B1 | 1/2015 | Chen et al. | |
| 2002/0026531 A1 | 2/2002 | Keane et al. | |
| 2002/0046348 A1 | 4/2002 | Brustoloni | |
| 2002/0053031 A1 | 5/2002 | Bendinelli et al. | |
| 2003/0065950 A1 | 4/2003 | Yarborough | |
| 2003/0081624 A1 * | 5/2003 | Aggarwal et al. | 370/412 |
| 2003/0088788 A1 | 5/2003 | Yang | |
| 2003/0135653 A1 | 7/2003 | Marovich | |
| 2003/0152078 A1 * | 8/2003 | Henderson et al. | 370/389 |
| 2003/0167340 A1 | 9/2003 | Jonsson | |
| 2004/0054920 A1 | 3/2004 | Wilson et al. | |
| 2004/0107360 A1 | 6/2004 | Herrmann et al. | |
| 2004/0184442 A1 * | 9/2004 | Jones et al. | 370/351 |
| 2004/0243718 A1 | 12/2004 | Fujiyoshi | |
| 2005/0027947 A1 | 2/2005 | Landin | |
| 2005/0033985 A1 | 2/2005 | Xu et al. | |
| 2005/0038898 A1 | 2/2005 | Mittig et al. | |
| 2005/0050364 A1 | 3/2005 | Feng | |
| 2005/0074001 A1 | 4/2005 | Mattes et al. | |
| 2005/0114492 A1 | 5/2005 | Arberg et al. | |
| 2005/0135422 A1 | 6/2005 | Yeh | |
| 2005/0144468 A1 | 6/2005 | Northcutt et al. | |
| 2005/0169285 A1 | 8/2005 | Wills et al. | |
| 2005/0251856 A1 | 11/2005 | Araujo et al. | |
| 2006/0031506 A1 | 2/2006 | Redgate | |
| 2006/0062142 A1 | 3/2006 | Appanna et al. | |
| 2006/0063517 A1 | 3/2006 | Oh et al. | |
| 2006/0064440 A1 | 3/2006 | Perry | |
| 2006/0080446 A1 | 4/2006 | Bahl | |
| 2006/0126625 A1 | 6/2006 | Schollmeier et al. | |
| 2006/0195698 A1 | 8/2006 | Pinkerton et al. | |
| 2006/0227771 A1 | 10/2006 | Raghunath et al. | |
| 2007/0002857 A1 | 1/2007 | Maher | |
| 2007/0011419 A1 | 1/2007 | Conti | |
| 2007/0124487 A1 | 5/2007 | Yoshimoto et al. | |
| 2007/0177506 A1 | 8/2007 | Singer et al. | |
| 2007/0180226 A1 | 8/2007 | Schory et al. | |
| 2007/0180513 A1 | 8/2007 | Raz et al. | |
| 2007/0294694 A1 | 12/2007 | Jeter et al. | |
| 2008/0034111 A1 | 2/2008 | Kamath et al. | |
| 2008/0034419 A1 | 2/2008 | Mullick et al. | |
| 2008/0040789 A1 | 2/2008 | Chen et al. | |
| 2008/0216177 A1 | 9/2008 | Yokosato et al. | |
| 2008/0289044 A1 | 11/2008 | Choi | |
| 2009/0049537 A1 | 2/2009 | Chen et al. | |
| 2009/0113536 A1 | 4/2009 | Zhang et al. | |
| 2009/0210698 A1 | 8/2009 | Candelore | |
| 2010/0257278 A1 | 10/2010 | Gunturu | |
| 2010/0333209 A1 | 12/2010 | Alve | |
| 2011/0307606 A1 | 12/2011 | Cobb | |
| 2012/0155495 A1 * | 6/2012 | Clee et al. | 370/474 |
| 2013/0089099 A1 * | 4/2013 | Pollock et al. | 370/394 |
| 2013/0311686 A1 * | 11/2013 | Fetterman et al. | 710/54 |
| 2013/0315241 A1 | 11/2013 | Kamat et al. | |
| 2015/0047012 A1 | 2/2015 | Chen et al. | |

FOREIGN PATENT DOCUMENTS

| | | |
|---|---|---|
| CN | 101495993 | 7/2009 |
| CN | 101878663 | 11/2010 |
| CN | ZL 200780001807.5 | 2/2011 |
| CN | 103365654 | 10/2013 |
| CN | 103428261 | 12/2013 |
| CN | 101878663 | 6/2014 |
| EP | 1720287 | 11/2006 |
| EP | 2575328 | 10/2008 |
| EP | 2057552 | 5/2009 |
| EP | 2215863 | 8/2010 |
| EP | 2667571 | 11/2013 |
| EP | 2575328 | 11/2014 |
| HK | 1182547 | 11/2013 |
| HK | 1188498 | 5/2014 |
| HK | 1190539 A | 7/2014 |
| JP | 2004350188 | 12/2004 |
| JP | 2005-518595 | 6/2005 |
| JP | 2006180295 | 7/2006 |
| JP | 2006333245 | 12/2006 |
| JP | 2007-48052 | 2/2007 |
| JP | 2011065752 | 2/2011 |
| JP | 2013059122 | 3/2013 |
| JP | 2013070423 | 4/2013 |
| JP | 2013078134 | 4/2013 |
| JP | 5364101 | 9/2013 |
| JP | 5480959 | 2/2014 |
| JP | 5579820 | 7/2014 |
| JP | 5579821 | 7/2014 |
| TW | NI086309 | 2/1996 |
| TW | NI109955 | 12/1999 |
| TW | NI130506 | 3/2001 |
| TW | NI137392 | 7/2001 |
| WO | 03073216 | 9/2003 |
| WO | 03103233 | 12/2003 |
| WO | 2006065691 | 6/2006 |
| WO | 2007076883 | 7/2007 |
| WO | 2008021620 | 2/2008 |
| WO | 2009073295 | 6/2009 |

OTHER PUBLICATIONS

Smith, M. et al; "Network Security Using NAT and NAPT", 10th IEEE International Converence on Aug. 27-30, 2002, Piscataway, NJ, USA, 2012; Aug. 27, 2002; pp. 355-360.

Cardellini et al., "Dynamic Load Balancing on Web-server Systems", IEEE Internet Computing, vol. 3, No. 3, pp. 28-39, May-Jun. 1999.

Wang et al., "Shield: Vulnerability Driven Network Filters for Preventing Known Vulnerability Exploits", SIGCOMM'04, Aug. 30-Sep. 3, 2004, Portland, Oregon, USA.

* cited by examiner

Step 931: Packet editor 350 stores script entries into control memory 354.

Step 933: Control module 356 retrieves and processes script entry 542.

Step 935: Control module 356 checks SOP 554 and prepares packet buffer 359.

Step 937: Control module 356 copies a block of data from data block 527 into packet buffer 359, based on block location 551 and block length 552.

Step 939: Control module 356 checks EOP 553 and completes generation of data packet 353.

Step 943: Checksum module 358 computes checksum for data packet 353.

Step 949: Control module 356 checks EOT 555. If EOT 555 is 0, repeats steps 933-949. If EOT 555 is 1, packet editor 350 completes processing packet editing script 512.

Figure 4a

HARDWARE-BASED PACKET EDITOR

BACKGROUND OF THE INVENTION

1. Field

This invention relates generally to data communications, and more specifically, to a service gateway.

2. Background

Service gateways such as firewall, server load balancers have been deployed by service providers and enterprises. In the past, service gateways were used for special purposes such as security. They are, however, used in expanded ways today. Many service providers deploy service gateways to perform various service gateway applications to examine and analyze data packets of a communication session between a host device and a server computer. Many gateway applications modify the packets to assist the analysis of the data packets and the communication sessions. Packet modification is a computation intensive and memory access intensive task. The modification task is usually performed by a processor module of a service gateway. Typically the processor or processor module analyzes a data packet, determines the necessary modification data blocks, creates a packet memory buffer, copies some data from the data packet into the data packet memory buffer and copies the modification data blocks into the packet memory buffer. When the data copying is completed, the processor has generated a new data packet from the original data packet. The service gateway then sends the generated data packet onto the network.

The data packet modification process is costly to the processor module, consuming CPU cycles and memory access bandwidth. If the data packet modification process can be offloaded and handled by a high performing hardware-based module of service gateway, the processor module can allocate its resources to handle additional data packets or additional communication sessions.

Therefore, there is a need to introduce a hardware-based high performing packet editing module to handle the data packet modification.

BRIEF SUMMARY OF THE INVENTION

According to one embodiment of the present invention, a method for modifying a data packet by a hardware-based packet editor, comprises: receiving, by the packet editor, a packet editing script comprising one or more script entries indicating modifications to be applied to the data packet and a data block comprising data for the modified packet; for each given script entry in the packet editing script, copying, by the packet editor, data in the data block at a location and a size identified in the given script entry into a packet buffer; and generating, by the packet editor, a modified data packet with the data in the packet buffer.

In one aspect of the present invention, the copying comprises: retrieving the given script entry of the packet editing script; determining whether the given script entry is a first script entry for the modified data packet; in response to determining that the given script entry is the first script entry for the modified data packet, reserving the packet buffer for the modified data packet; copying the data in the data block at a block location and with a block length identified in the given editing script into the packet buffer; determining whether the given script entry is a last script entry for the modified data packet; in response to determining that the given script entry is not the last script entry for the modified data packet, performing the copying the data in the data block at a block location and with a block length identified in the given script entry into the packet buffer and the determining whether the given script is a last script entry for the next given script entry of the packet editing script.

In one aspect of the present invention, the determining whether the given script entry is the first script entry comprises: determining whether a start of packet (SOP) indicator in the given script entry indicates that the given script entry is the first script entry for the modified data packet.

In one aspect of the present invention, the determining whether the given script entry is the last script entry comprises: determining whether an end of packet (EOP) indicator in the given script entry indicates that the given script entry is the last script entry for the modified data packet.

In one aspect of the present invention, the reserving and the copying the data in the data block at a block location and with a block length identified in the given script entry into the packet buffer comprises: setting a packet buffer marker at a beginning of the packet buffer; appending a copy of the data in the data block at the block location and with the block length identified in the given editing script to the packet buffer at the packet buffer marker; and modifying the packet buffer marker by the block length identified in the given editing script.

In one aspect of the present invention, the generating comprises: in response to determining that the given script entry is the last script entry for the modified data packet, generating the modified data packet with the data in the packet buffer.

In one aspect of the present invention, the generating the modified data packet with the data in the packet buffer further comprises: determining whether the given script entry is the last script entry in the packet editing script; and in response to determining that the given script entry is not the last script entry in the packet editing script, repeating the retrieving, the determining whether the given script entry is a first entry, the reserving, the copying the data in the data block at a block location and with a block length identified in the given script entry into the packet buffer, the determining whether the given script entry is a last script entry, the performing, and the generating the modified data packet with the data in the packet buffer for a next given script entry in the packet editing script.

In one aspect of the present invention, the determining whether the given script entry is the last script entry in the packet editing script comprises: determining whether an end of table (EOT) indicator in the given script entry indicates that the given script entry is the last script entry in the packet editing script.

According to another embodiment of the present invention, a method for processing a data packet by a service gateway comprising a processor, comprises: receiving, by the processor, a data packet from a host to be sent to a server, or from the server to be sent to the host; determining, by the processor, that the data packet requires modification prior to sending to the server or the host; generating, by the processor, a packet editing script, the script comprising one or more script entries indicating modifications to be applied to the data packet and a data block comprising data for the modified packet, wherein the generating comprises: for each and any given portion of the data packet determined to be included in the modified packet, generating a first script entry identifying a first location and a first length in the data block corresponding to the given portion determined to be included; for each and any given portion of the data packet determined to be removed from the data packet, omitting generation of a script entry corresponding to the given portion determined to be removed; and for each and any new data determined to be added to the modified packet, generating the new data to be comprised in the data block of the packet editing script and generating a second script entry identifying a second location and a second length in the data block corresponding to the new data; and sending, by the processor, the packet editing script to a hardware-based packet editor, wherein the packet editor generates the modified packet according to the script entries in the packet editing script.

System and computer program products corresponding to the above-summarized methods are also described and claimed herein.

BRIEF DESCRIPTION OF THE SEVERAL VIEWS OF THE FIGURES

FIGS. 4 and 4a illustrate an embodiment of a packet editor processing flow according to the present invention.

DETAILED DESCRIPTION OF THE INVENTION

Figure 1:
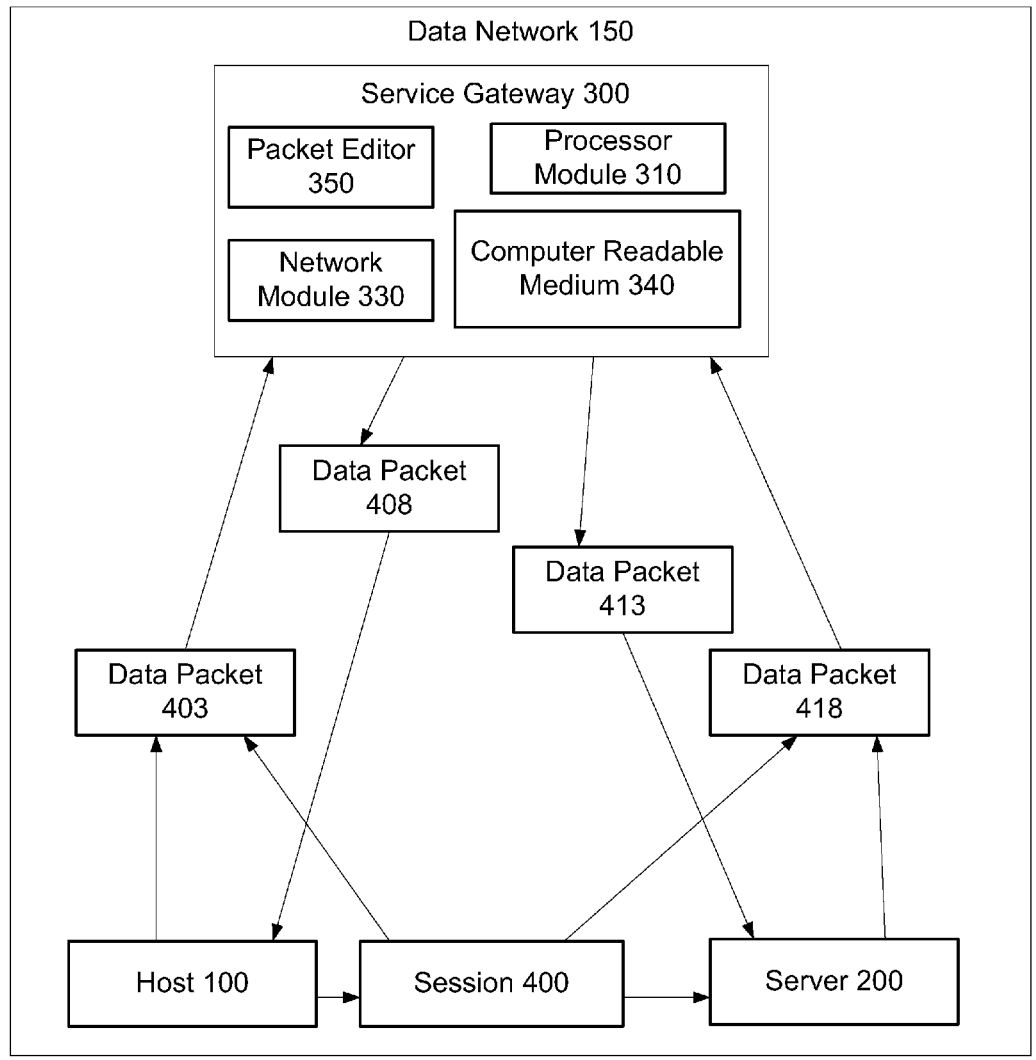
FIG. 1 illustrates an embodiment of a communication session processing method using a service gateway having a hardware-based packet editor according to the present invention.

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport eh program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In an embodiment illustrated in FIG. 1, a service gateway 300 processes a communication session 400 between a host 100 and a server 200. Communication session 400 is delivered over a data network 150.

In one embodiment, data network 150 includes an Internet Protocol (IP) network, a corporate data network, a regional corporate data network, an Internet service provider network, a residential data network, a wired network such as Ethernet, a wireless network such as a WiFi network, a Bluetooth network, or a cellular network. In one embodiment, data network 150 resides in a data center, or connects to a network or application network cloud.

Host 100 is a computing device with network access capabilities. In one embodiment, host 100 is a workstation, a desktop personal computer or a laptop personal computer, a Personal Data Assistant (PDA), a tablet PC, a smartphone, or a cellular phone, a set-top box, an Internet media viewer, an Internet media player, a smart sensor, a smart medical device, a net-top box, a networked television set, a networked DVR, a networked Blu-ray player, a media center, or a network connected device.

Server 200 is a computing device typically coupled to a processor and a computer readable medium which stores computer readable program code. Server 200, with the processor and the computer readable program code, implements functionality of a Web server, a file server, a video server, a database server, an application server, a voice system, a conferencing server, a media gateway, a media center, an app server or a network server providing a network service or an application service to host 100 using the communication session 400.

Service gateway 300 is operationally coupled to a processor module 310, a packet editor 350, a network interface module 330, and a computer readable medium 340. The computer readable medium 340 stores computer readable program code, which when executed by the processor module 310, implements the various embodiments of the present invention as described herein. In some embodiments, service gateway 300 is implemented as a server load balancer, an application delivery controller, a service delivery platform, a traffic manager, a security gateway, a component of a firewall system, a component of a virtual private network (VPN), a load balancer for video servers, a gateway to distribute load to one or more servers, a Web or HyperText Transport Protocol (HTTP) server handling the HTTP layer of the HTTP service session, or a gateway performing network address translation (NAT).

Processor module 310 typically includes one or more general processors or micro-processors. In one embodiment, processor module 310 includes a multi-core microprocessor. In one embodiment, processor module 310 includes a memory unit storing variables used during execution of the computer readable program code stored in computer readable medium 340.

Network interface module 330 connects to data network 150. Network interface module 330 receives data packets of communication session 400 from host 100 and server 200, and sends data packets of communication session 400 to host 100 and server 200.

Packet editor 350 is a hardware-based packet processing accelerating module, typically comprising high performing capabilities to process data packets. In one embodiment, packet editor 350 includes a field programmable gate array (FPGA) module, an application specific integrated circuit (ASIC), a digital signal processor (DSP), or a circuitry capable of performing the high speed processing needs of packet editor 350.

In one embodiment, host 100 sends a data packet 403 of communication session 400 towards server 200. Service gateway 300 receives data packet 403 through network module 330. Processor module 310 processes data packet 403 according to the computer readable program code stored on the computer readable medium 340. Processor module 310 determines that data packet 403 is to be modified by packet editor 350. Packet editor 350 receives data packet 403 and generates data packet 408. Network module 330 transmits data packet 408 to server 200.

In one embodiment, server 200 sends a data packet 418 of communication session 400 towards host 100. Service gateway 300 receives data packet 418 through network module 330. Processor module 310 processes data packet 418 according to the computer readable program code stored on the computer readable medium 340. Processor module 310 determines that data packet 418 to be modified by packet editor 350. Packet editor 350 receives data packet 418 and generates data packet 413. Network module 330 transmits data packet 408 to server 200.

In one embodiment, data packet 403 is a HTTP packet, and packet editor 350 removes a part of HTTP header of data packet 403 to generate data packet 408. In one embodiment, 418 is a HTTP packet and packet editor 350 inserts a HTTP header to data packet 418 in order to generate data packet 413.

In one embodiment, data packet 403 is an IP packet comprising an IP header, and packet editor 350 inserts a second IP header to data packet 403 in order to generate an IP tunnel data packet 413. In one embodiment, packet editor 350 performs IP fragmentation to generate data packet 413 and a second data packet (not shown) prior to sending data packet 413 and the second data packet to server 200. In one embodiment, data packet 418 is an IP tunnel packet and packet editor 350 removes an IP header from data packet 418 in order to generate data packet 413.

In one embodiment, packet editor 350 processes data packet 403 to generate data packet 408 by copying one or more data blocks of data packet 403 onto data packet 408, copying additional data blocks onto data packet 408 through instruction from processor module 310, computing a checksum using one or more parts of data packet 403, and placing the checksum onto data packet 408.

The above mentioned data packet modification of data packet 408 are applicable in many implementations of service gateway 300, for example, as a HTTP proxy server, TCP proxy server, Layer 3/Layer 4 tunnel gateway, a firewall, IP tunnel gateway, IPv4/IPv6 tunneling gateway, IP-IP tunneling gateway.

Figure 2:
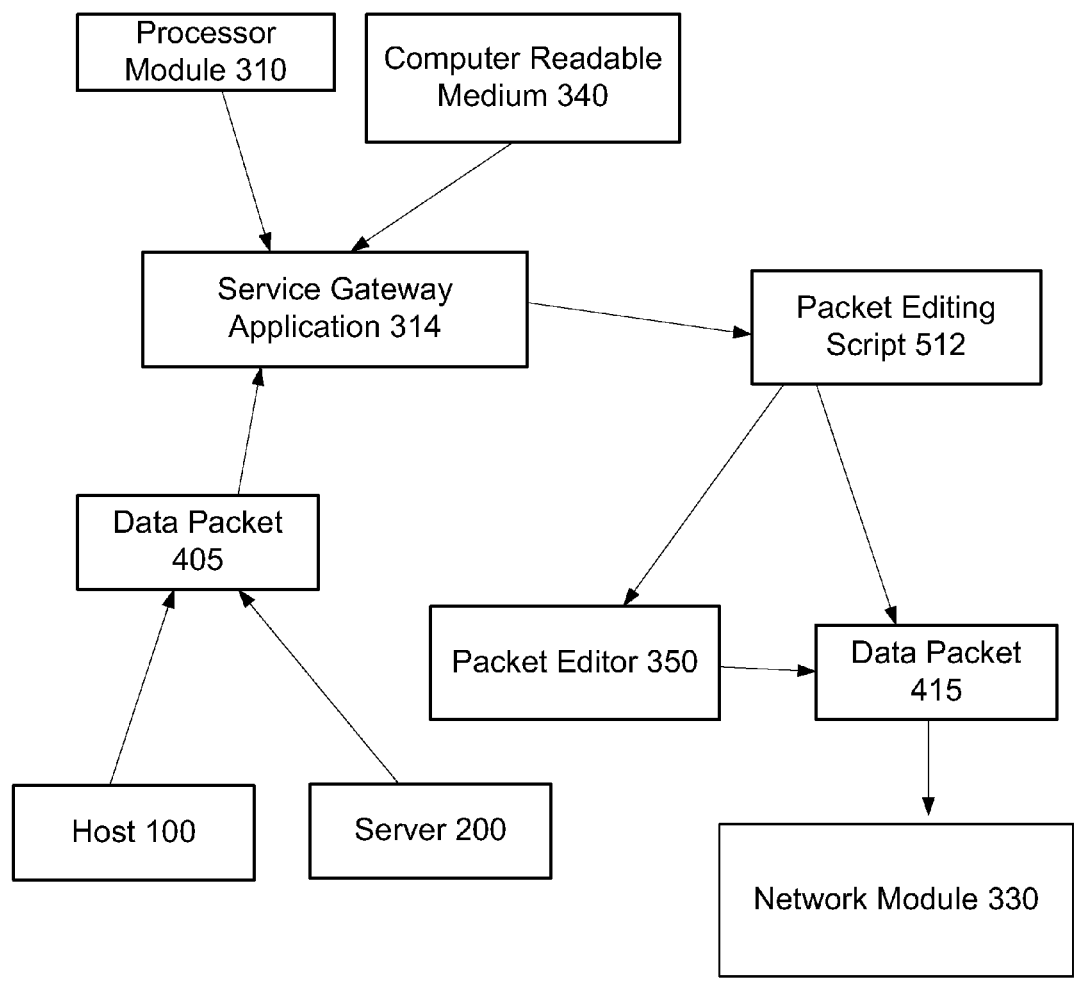
FIG. 2 illustrates an embodiment of a packet processing flow according to the present invention.

FIG. 2 illustrates service gateway 300 processing a data packet 405. Service gateway 300 receives a data packet 405. Data packet 405 may be sent by host 100 or server 200. Service gateway 300 implements a service gateway application 314, which is a software residing in computer readable medium 340 executed by processor module 310. Application 314 determines, based on data packet 405, that data packet 405 requires modification. Application 314 generates a packet editing script 512. Packet editing script 512 includes one or more script entries that indicate the necessary modification(s) to be applied to data packet 405. When the application 314 determines that data is to be included in the data packet 405, the application 314 generates a script entry describing the data to be included. When the application 314 determines that data is to be removed from the data packet 405, the application 314 omits generating a script entry that would describe the data being removed. When the application 314 determines that data is to be inserted into the data packet 405, the application 314 generates a script entry describing the data to be inserted. A more detailed description of the packet editing script 512 follows later in this specification.

For example, in one embodiment, application 314 determines that a HTTP header is to be removed from data packet 405. Packet editing script 512 describes the part of HTTP header to be removed. In one embodiment, application 314 determines that a HTTP header is to be inserted into data packet 405. Packet editing script 512 describes the location where the HTTP header is to be inserted and the data for the HTTP header. In one embodiment, application 314 determines that an additional IP header is to be inserted into data packet 405. Packet editing script 512 describes the details of the additional IP header such that packet editor 350 will perform the insertion. In one embodiment, packet editing script 512 includes data packet 405. Application 314 then sends the packet editing script 512 to the packet editor 350, effectively informing the packet editor 350 that it is to modify data packet 405 using packet editing script 512.

Packet editor 350 receives packet editing script 512 and generates data packet 415 based on the packet editing script 512.

In one embodiment, packet editor 350 sends data packet 415 to network module 330 for transmission. In one embodiment, packet editor 350 informs application 314 after generation of data packet 415. Application 314 informs network module 330 to transmit data packet 415.

Figure 3:
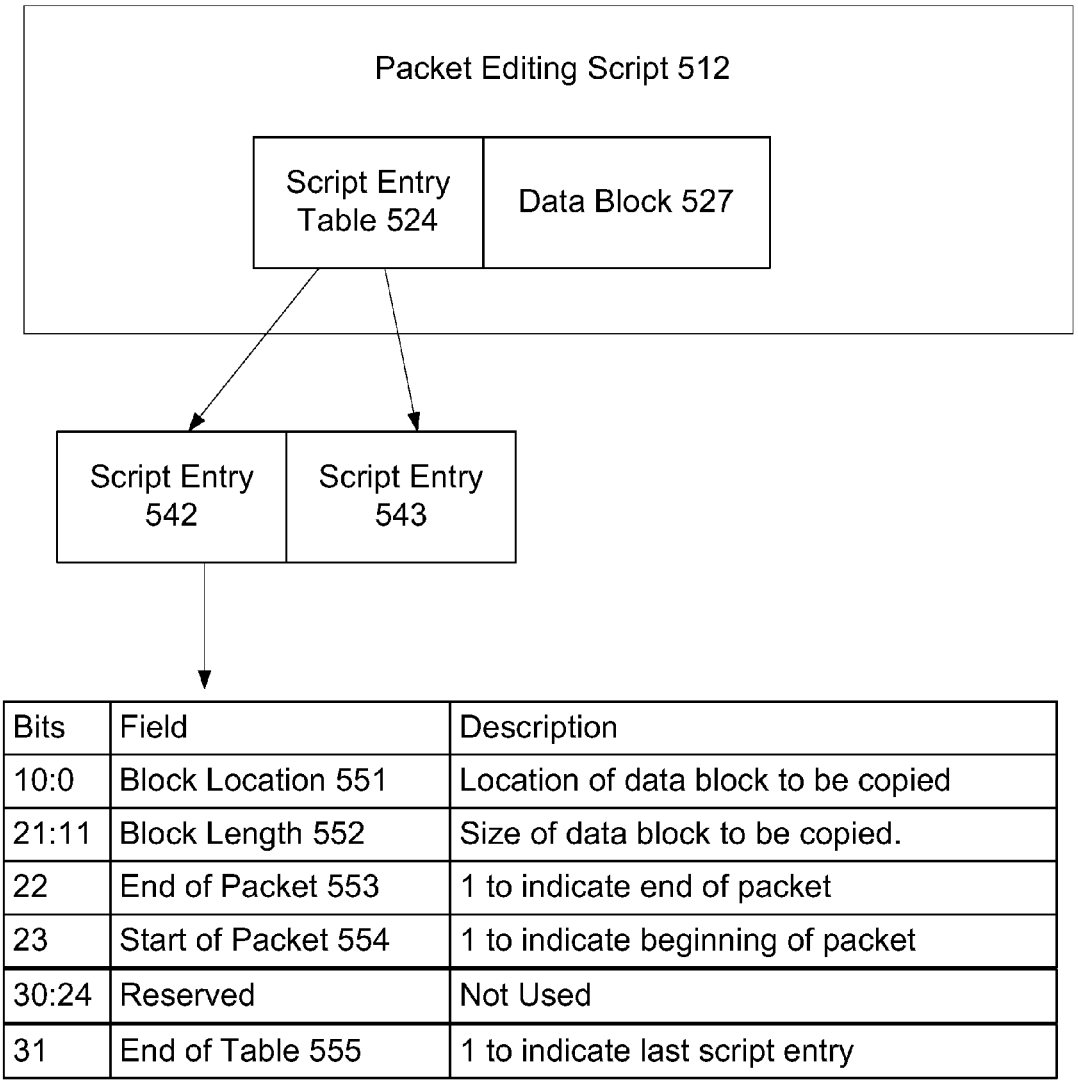
FIG. 3 illustrates an embodiment of a packet editing script according to the present invention.

FIG. 3 illustrates a packet editing script 512. In one embodiment, packet editing script 512 includes a script entry table 524 and a data block 527.

Script entry table 524 includes a script entry 542. In one embodiment, script entry 542 includes a plurality of field comprising a block location 551, a block length 552, a start-of-packet indication (SOP) 554, an end-of-packet indication (EOP) 553, and an end-of-script indication (EOT) 555. In one embodiment, SOP 554, EOP 553 and EOT 555 are 1-bit long indicators; block location 551 has a 10-bit value; block length 552 has an 11-bit value. Script entry 542 may include one or more unused multi-bit fields such that script entry 542 is a 4-byte or 32-bit long data structure.

Block location 551 and block length 552 references a block of data in data block 527. Block location 551 refers to the location of data block 527.

In one embodiment, script entry table 524 includes a second script entry 543 with the same fields. The one or more script entries, such as script entry 542 and script entry 543, are used by packet editor 350 to generate a modified data packet.

Data block 527 contains one or more blocks of data to generate a modified data packet.

Figure 4:
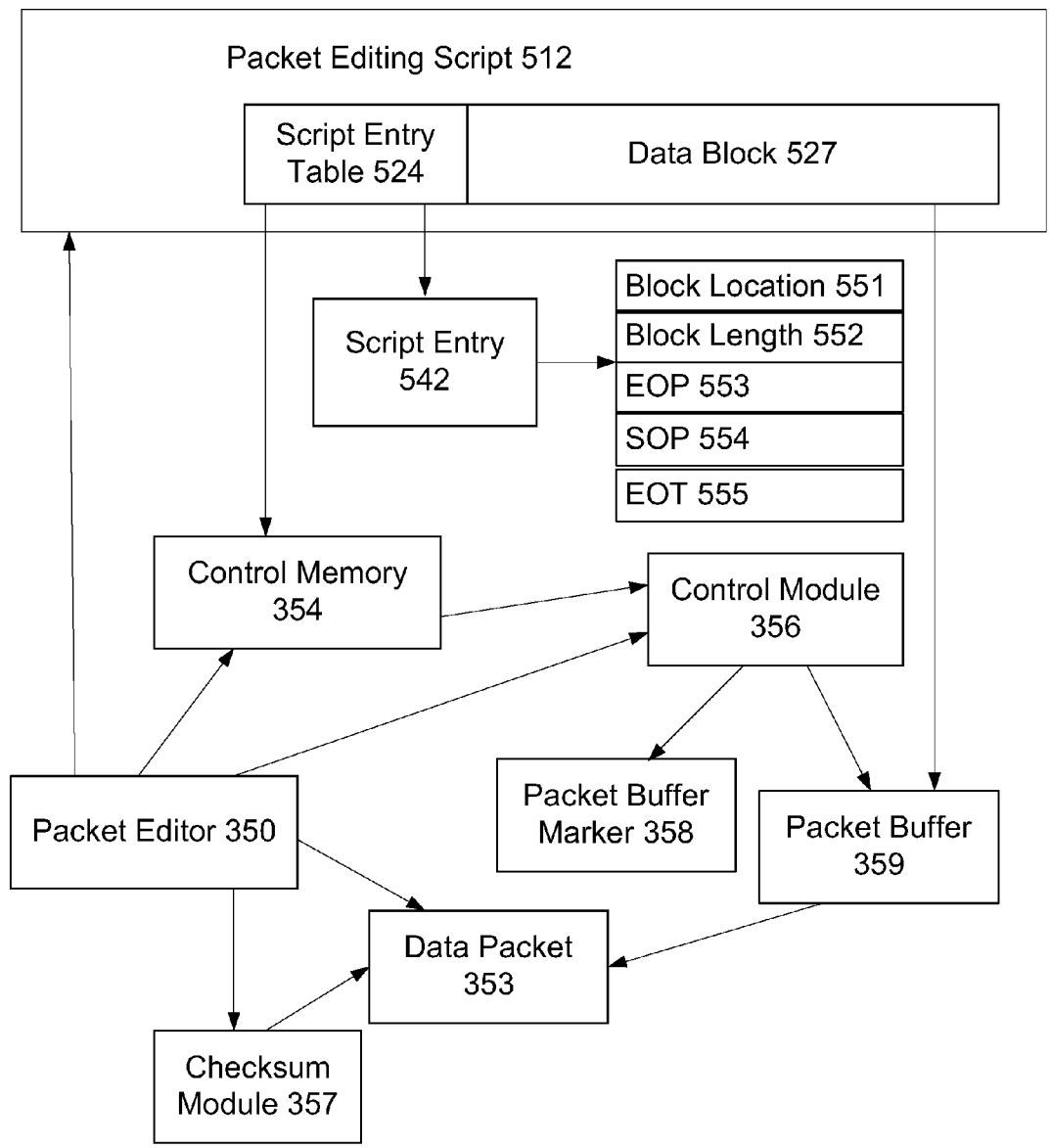

FIG. 4 illustrates packet editor 350 generating a data packet 353 based on packet editing script 512. In this embodiment, packet editor 350 includes a control memory 354, a control module 356, a packet buffer 359, and a packet buffer marker 358.

FIG. 4a illustrates, in conjunction with FIG. 4, a processing flow of packet editor 350. In step 931, in response to receiving the packet editing script 512, packet editor 350 retrieves one or more script entries from script entry table 524 and stores the script entries into control memory 354. In one embodiment packet editor 350 retrieves script entry 542 from script entry table 524 and stores script entry 542 into control memory 354. Packet editor 350 examines EOT 555 of script entry 542. In one embodiment, EOT 555 has a value of 0. Packet editor 350 determines script entry 542 is not the last script entry of script entry table 524. Packet editor 350 retrieves a next script entry from script entry table 524. In one embodiment, EOT 555 has a value of 1. Packet editor 350 determines script entry 542 is the last script entry of script entry table 524. Packet editor 350 completes step 951.

In step 933, control module 356 retrieves script entry 542 from control memory 354, and starts to process script entry 542.

In step 935, control module 356 examines SOP 554. In one embodiment, SOP 554 has a value of 1. Control module 356 reserves packet buffer 359 in order to generate a data packet 353. Control module 356 sets the value of packet buffer marker 358 at 0, or at the beginning of packet buffer 359. In one embodiment, SOP 554 has a value of 0. Control module 356 proceeds to another step.

In step 937, control module 356 copies a block of data from data block 527 to packet buffer 359, based on block location 551 and block length 552 of script entry 542. Control module 356 appends to packet buffer 359 at the packet buffer marker 358 the block of data from data block 527 starting from block location 551 with a size of block length 552. Control module 356 increases packet buffer marker 358 by the value of block length 552, such that the subsequent copy would start after the current copied data block.

In step 939, control module 356 examines EOP 553. In one embodiment, EOP 553 has a value of 1. Control module 356 determines the completion of generating data packet 353 in packet buffer 359, with a block of data up to the packet buffer marker 358. Packet editor 350 continues with step 943. In one embodiment, EOP 553 has a value of 0, step 943 is skipped, and control module 356 proceeds to step 949.

In step 943, packet editor 350 further includes a checksum module 357. Checksum module 357 computes a checksum for data packet 353. In one embodiment, data packet 353 includes an IP packet. Checksum module 357 computes a checksum for the IP header and modifies data packet 353 with the computed checksum. In one embodiment, data packet 353 includes a TCP or UDP packet, checksum module 357 computes a checksum for the corresponding TCP or UDP packet, and modifies data packet 353 with the computed checksum. In one embodiment, data packet 353 includes a packet format requiring a checksum, checksum module 357 computes a checksum for the packet format and modifies data packet 353 with the computed checksum.

In step 949, control module 356 examines EOT 555. In one embodiment, EOT 555 has a value of 1. Control module 356 determines processing of packet editing script 512 is completed. In one embodiment, EOT 555 has a value of 0, control module 356 fetches a second script entry from control memory 354 and repeats performing steps 933-949 for the second script entry.

Figure 5:
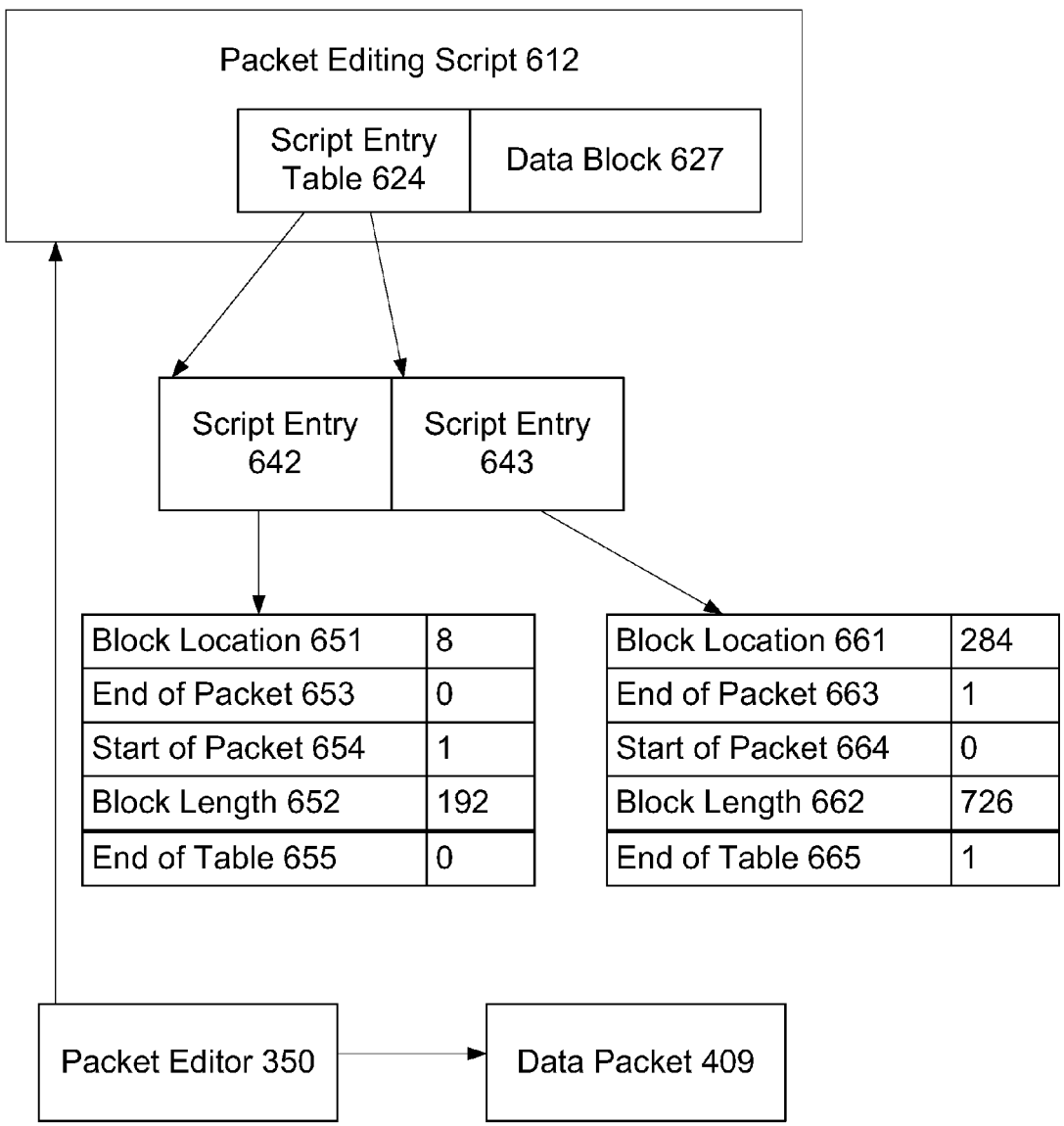
FIG. 5 illustrates an example of a removal of a HTTP header attribute according to an embodiment of the present invention.

FIG. 5 illustrates an example packet editing script 612 to remove a HTTP header field. In this embodiment, script entry table 624 includes script entry 642 and script entry 643. Script entry 642 includes
  Block location 651=8
  Block length 652=192
  SOP 654=1
  EOP 653=0
  EOT 655=0
  Script entry 643 includes
  Block location 661=284
  Block length 662=726
  SOP 664=0
  EOP 663=1
  EOT 665=1

Data block 627 includes a total of 1000 bytes of data, which may be a HTTP packet.

Packet editor 350 constructs a data packet 409 according to packet editing script 612, as illustrated in FIG. 4. More specifically, packet editor 350 obtains script entry 642 of script entry table 624. Script entry 642 indicates in EOT 655 (of value 0) that script entry 642 is not the last script entry in script entry table 624. SOP 654 of value 1 indicates a beginning of a data packet. Packet editor 350 prepares a packet buffer for data packet 409. Packet editor 350 examines block location 651 and block length 652. Packet editor 350 copies a total of 192 (value of block length 652) bytes of data block 627, starting at location 8 (value of block location 651).

EOP 653 of value 0 indicates generation of data packet 409 is not completed. After completion of script entry 642, packet editor 350 obtains script entry 643 and processes accordingly. SOP 664 has a value of 0, indicating to packet editor 350 to continue with data packet 409. Packet editor 350 examines block location 661 and block length 662. Packet editor 350 copies 726 (value of block length 662) bytes of data block 627 starting at location 284 (value of block location 661) of packet editing script 612. Upon completion of copying, packet editor 350 determines from the value (1) of EOP 663 that data packet 409 generation is completed.

EOT 665 of value 1 indicates that script entry 643 is the last entry in script entry table 624. Packet editor 350 determines the completion of processing of packet editing script 612.

In this embodiment, packet editor 350 does not copy data block from location 192 to location 284 (for a total of 92 bytes). In one embodiment, the data block not copied represents a HTTP header field to be removed.

Figure 6:
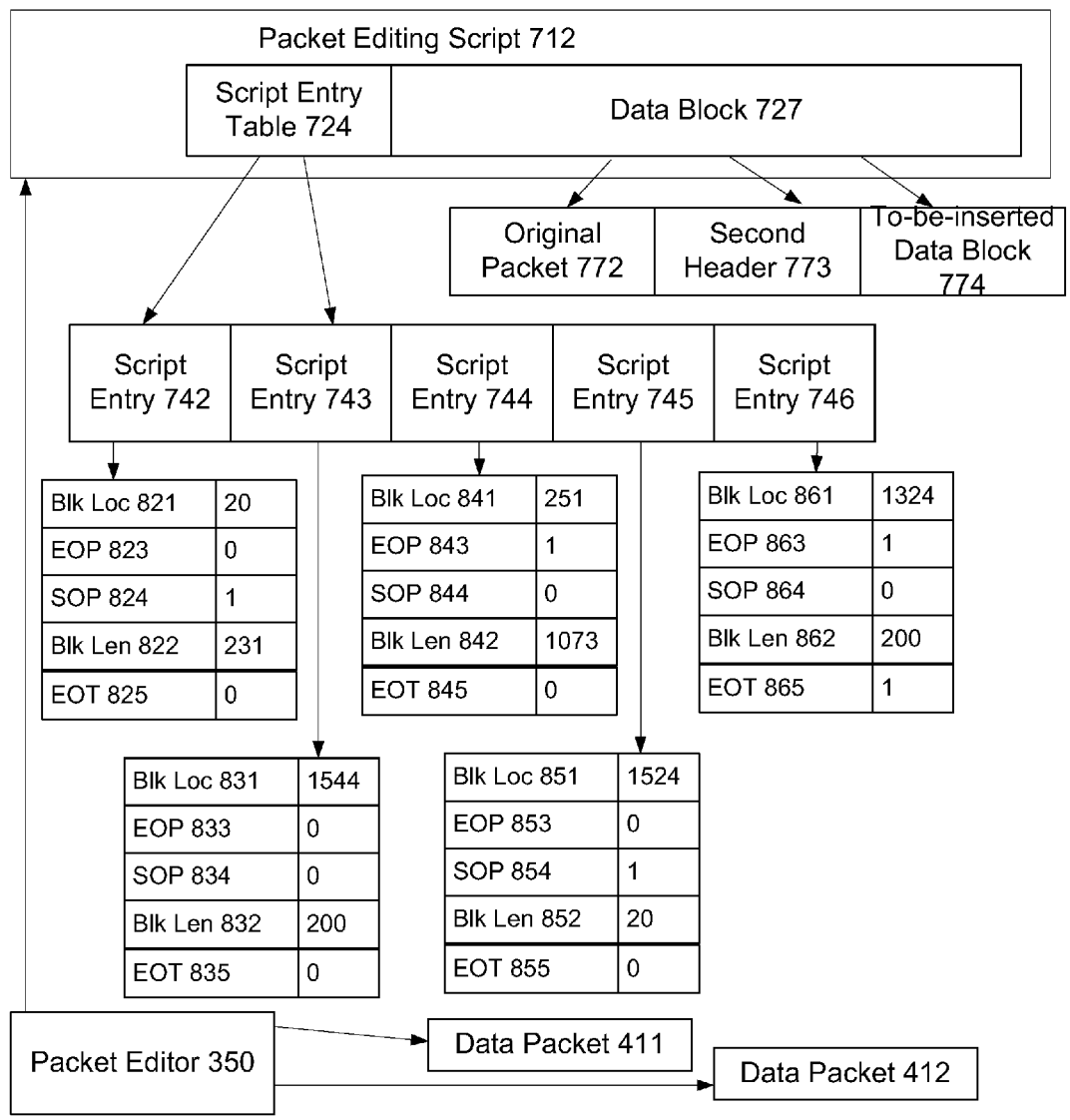
FIG. 6 illustrates an example of an insertion of a HTTP header and a fragmentation of a packet into two packets according to an embodiment of the present invention.

FIG. 6 illustrates an example a packet editing script 712 to insert of data, such as a HTTP header field, and to generate two data packets. In one embodiment, generation of two packets indicates fragmenting an IP packet into two IP packets. In this example, packet editing script 712 includes script entry table 724, which includes script entries 742, 743, 744, 745, and 746.

Script entry 742 includes
Block location 821=0
Block length 822=231
SOP 824=1
EOP 823=0
EOT 825=0
Script entry 743 includes
Block location 831=1544
Block length 832=200
SOP 834=0
EOP 833=0
EOT 835=0
Script entry 744 includes
Block location 841=251
Block length 842=1073
SOP 844=0
EOP 843=1
EOT 845=0
Script entry 745 includes
Block location 851=1524
Block length 852=20
SOP 854=1
EOP 853=0
EOT 855=0
Script entry 746 includes
Block location 861=1324
Block length 862=200
SOP 864=0
EOP 863=1
EOT 865=1

Data block 727 includes an original packet 772, a second packet header 773, and a to-be-inserted data block 774. In this example, original packet 772 has a size of 1504 bytes; second packet header 773 is of size 20 bytes and to-be-inserted data block 774 is of size 200 bytes.

The block location of original packet 772 is 20 in data block 727. The block location of the second packet header 773 is 1524. The block location of the to-be-inserted data block 774 is 1324.

According to the process illustrated in FIG. 4, packet editor 350 processes in the order of script entries 742, 743, 744, 745 and 746, and generates data packet 411 and data packet 412. In processing script entry 742 with SOP 824 being 1, packet editor 350 prepares data buffer for data packet 411. Packet editor 350 copies a block of data from data block 727 of size 231 bytes (value of block length 822) from location 20 (value of block location 821). The block of data copied is the first 231 bytes of original packet 772. Next, packet editor 350, according to script entry 743, copies a block of data from data block 727 of size 200 (value of block length 832) from location 1544 (value of block location 831) onto data packet 411. The block of data copied includes the entirety of the to-be-inserted data block 774.

Then packet editor 350, according to script entry 744, copies a block of data from data block 727 of size 1073 (value of block length 842) from location 251 (value of block location 841) onto data packet 411. The block of data copied is a data block in original packet 772 immediately following the block of data copied in script entry 742. EOP 843 being 1 indicates completion of data packet 411 generation.

Then packet editor 350 proceeds to process script entry 745. SOP 854 being 1 instructs packet editor 350 to prepare to generate data packet 412. Packet editor 350 copies a block of data from data block 727 of size 20 bytes (value of block length 852) from location 1524 (value of block location 851) onto data packet 412. The block of data copied includes the entirety of the second packet header 773.

Packet editor 350 proceeds to process script entry 746. Packet editor 350 copies a block of data from data block 727 of size 200 bytes (value of block length 862) from location 1324 (value of block location 861) onto data packet 412. The block of data copied is the remaining data of the original packet 772, after the block of data copied in script entry 744.

EOP 863 of script entry 746 has a value 1. Packet editor 350 determines data packet 412 generation is completed. EOT 865 of script entry 746 has a value 1. Packet editor 350 determines processing of packet editing script 712 is completed. As a result of completing packet editing script 712, packet editor 350 generates data packet 411 and data packet 412.

The above figures illustrate embodiments of packet editing script 512 to remove or not to copy one or more blocks of data from data block 527 and to copy one or more blocks of data from data block 527. By using the copying instructions, those skilled in the art may formulate a packet editing script for various data packet manipulation.

Figure 7:
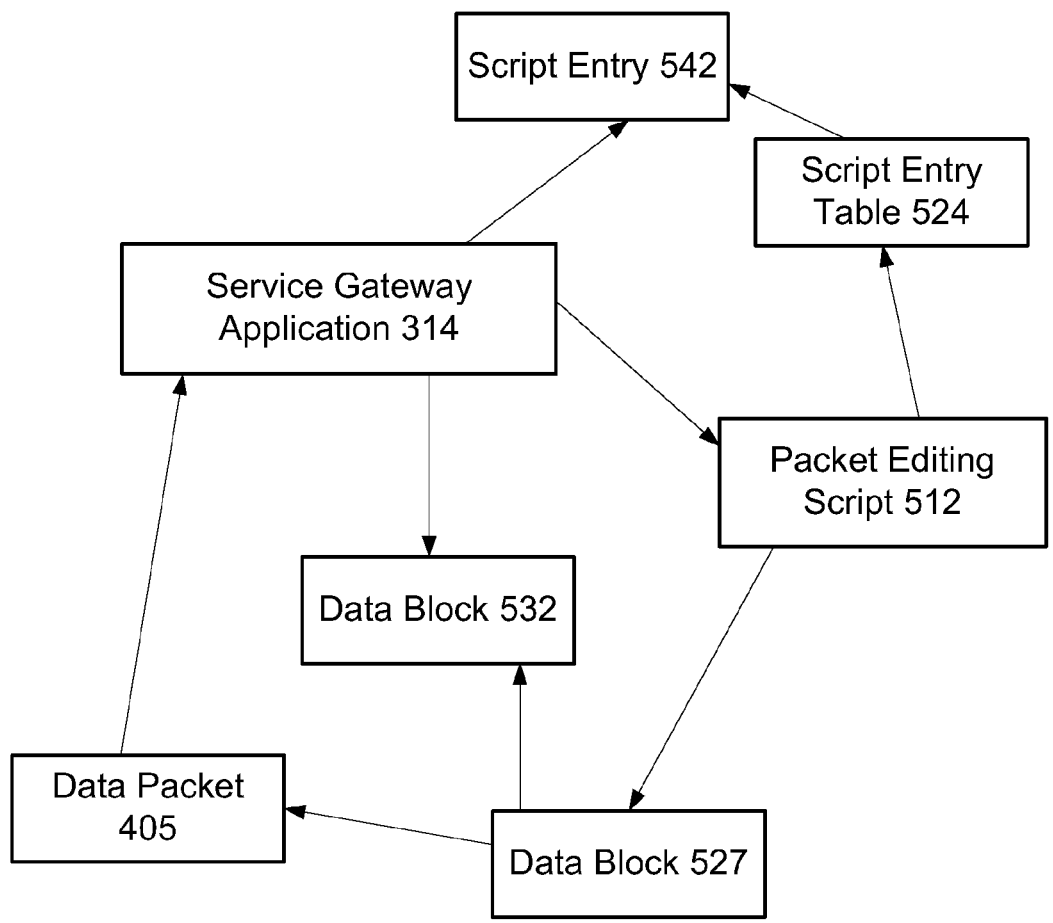
FIG. 7 illustrates additional embodiments of a service gateway application according to the present invention.

In one embodiment, service gateway application 314, illustrated in FIG. 7, implements a network address translation of an input data packet 405. Service gateway application 314 prepares a data block 532 as a replacement IP/TCP/UDP header for data packet 405. Service gateway application 314 creates a packet editing script 512 wherein the data block 527 includes data packet 405 and data block 532, and script entry table 524 to include one or more script entries to instruct packet editor 350 not to copy the IP/TCP/UDP header of data packet 405, copy data block 532, and copy the remaining portion of data packet 405.

In one embodiment of the present invention, service gateway application 314 implements an IP tunneling gateway (such as IP-IP tunnel, IPv4/IPv6 tunnel). Service gateway application 314 receives data packet 405 and determines that an IP tunnel header is to be inserted. Service gateway application 314 prepares data block 532 as the IP tunnel header. Service gateway application 314 creates a packet editing script 512, where the data block 527 includes data packet 405 and data block 532, and script entry table 524 to include one or more script entries to instruct packet editor 350 to copy data block 532, and to copy data packet 405.

In one embodiment, service gateway application 314 determines an IP tunnel header is to be removed. Service gateway application 314 determines the size of the IP tunnel header. Service gateway application 314 creates a packet editing script 512, where the data block 527 includes data packet 405, and a script entry 542 such that the block location of script entry 542 skips the tunnel header. Packet editing script 512 instructs packet editor 350 to copy data packet 405 while skipping, or not copying, the IP tunnel header.

In one embodiment, service gateway application 314 implements a proxy service such as TCP proxy or HTTP proxy. Service gateway application 314 receives an input data packet 405 and determines that a first plurality of data blocks in data packet 403 is to be replaced by a second plurality of data blocks. Service gateway application 314 prepares the second plurality of data blocks, and creates a packet editing script 512, where the data block 527 of packet editing script 512 includes data packet 405 and the second plurality of data blocks. The packet editing script 512 also prepares script entry table 524 to include a plurality of script entries instructing packet editor 350 to copy certain data blocks from data packet 405, not to copy the first plurality of data blocks from data packet 405, and to copy the second plurality of data blocks, in essence replacing the first plurality of data blocks with the second plurality of data blocks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for modifying a data packet by a hardware-based packet editor comprising:
   receiving, by the packet editor, a packet editing script comprising one or more script entries indicating modifications to be applied to the data packet and a data block comprising data for the modified packet;
   for each given script entry in the packet editing script, copying, by the packet editor, data in the data block at a location and a size identified in the given script entry into a packet buffer;
   generating, by the packet editor, a modified data packet with the data in the packet buffer,
   wherein the copying comprises:
      retrieving the given script entry of the packet editing script;
      determining whether the given script entry is a first script entry for the modified data packet;
      in response to determining that the given script entry is the first script entry for the modified data packet, reserving the packet buffer for the modified data packet;
      copying the data in the data block at a block location and with a block length identified in the given script entry into the packet buffer;
      determining whether the given script entry is a last script entry for the modified data packet; and
      in response to determining that the given script entry is not the last script entry for the modified data packet, performing the copying the data in the data block at a block location and with a block length identified in the given script entry into the packet buffer and the determining whether the given script entry is a last script entry for the next given script entry of the packet editing script.

2. The method of claim 1 wherein the determining whether the given script entry is the first script entry comprises:
   determining whether a start of packet (SOP) indicator in the given script entry indicates that the given script entry is the first script entry for the modified data packet.

3. The method of claim 1 wherein the determining whether the given script entry is a last script entry comprises:
   determining whether an end of packet (EOP) indicator in the given script entry indicates that the given script entry is the last script entry for the modified data packet.

4. The method of claim 1 wherein the reserving and the copying the data in the data block at a block location and with a block length identified in the given script entry into the packet buffer comprises:
   setting a packet buffer marker at a beginning of the packet buffer;
   appending a copy of the data in the data block at the block location and with the block length identified in the given editing script to the packet buffer at the packet buffer marker; and
   modifying the packet buffer marker by the block length identified in the given editing script.

5. The method of claim 1 wherein the generating comprises:
   in response to determining that the given script entry is the last script entry for the modified data packet, generating the modified data packet with the data in the packet buffer.

6. The method of claim 5 wherein the generating the modified data packet with the data in the packet buffer further comprises:
   determining whether the given script entry is the last script entry in the packet editing script; and
   in response to determining that the given script entry is not the last script entry in the packet editing script, repeating the retrieving, the determining whether the given script entry is a first script entry, the reserving, the copying the data in the data block at a block location and with a block length identified in the given script entry into the packet buffer, the determining whether the given script entry is a last script entry, the performing, and the generating the modified data packet with the data in the packet buffer for a next given script entry in the packet editing script.

7. The method of claim 6 wherein the determining whether the given script entry is the last script entry in the packet editing script comprises:
   determining whether an end of table (EOT) indicator in the given script entry indicates that the given script entry is the last script entry in the packet editing script.

8. A system, comprising:
   a packet buffer; and
   a hardware-based packet editor comprising a control memory and a control module,
   wherein the packet editor:
      receives a packet editing script comprising one or more script entries indicating modifications to be applied to a data packet and a data block comprising data for the modified packet; and
      stores the packet editing script in the control memory, wherein the control module:
      retrieves each given script entry stored in the control memory;
      copies data in the data block at a location and a size identified in the given script entry into the packet buffer; and
      generates a modified data packet with the data in the packet buffer,
   wherein copying (4) the data in the data block at the location and the size identified in the given script entry into the packet buffer, the control module:
      determines whether the given script entry is a first script entry for the modified data packet; and in response to determining that the given script entry is the first script entry for the modified data packet, reserves the packet buffer for the modified data packet;

copies the data in the data block at a block location and with a block length identified in the given script entry into the packet buffer;

determines whether the given script entry is a last script entry for the modified data packet; and in response to determining that the given script entry is not the last script entry for the modified data packet, performs, for the next given script entry of the packet editing script, the copying of the data in the data block at the block location and with the block length identified in the given script entry into the packet buffer and the determining whether the given script entry is a last script entry for the modified data packet for the next given script entry of the packet editing script.

9. The system of claim 8, wherein in determining whether the given script entry is the first script entry for the modified data packet, the control module:

determines whether a start of packet (SOP) indicator in the given script entry indicates that the given script entry is the first script entry for the modified data packet.

10. The system of claim 8 wherein in determining whether the given script entry is the last script entry for the modified data packet, the control module:

determines whether an end of packet (EOP) indicator in the given script entry indicates that the given script entry is the last script entry for the modified data packet.

11. The system of claim 8 wherein in reserving the packet buffer for the modified data packet and in copying the data in the data block at the block location and with the block length identified in the given script entry into the packet buffer, the control module:

sets a packet buffer marker at a beginning of the packet buffer;

appends a copy of the data in the data block at the block location and with the block length identified in the given editing script to the packet buffer at the packet buffer marker; and modifies the packet buffer marker by the block length identified in the given editing script.

12. The system of claim 8 wherein in generating the modified data packet with the data in the packet buffer, the control module:

in response to determining that the given script entry is the last script entry for the modified data packet, generates the modified data packet with the data in the packet buffer.

13. The system of claim 12 wherein in generating the modified data packet with the data in the packet buffer, the control module further:

determines whether the given script entry is the last script entry in the packet editing script; and in response to determining that the given script entry is not the last script entry in the packet editing script, repeating the retrieving, the determining whether the given script entry is a first script entry for the modified data packet, the reserving, the copying the data in the data block at a block location and with a block length identified in the given script entry into the packet buffer, the determining whether the given script entry is a last script entry for the modified data packet, the performing, and the generating the modified data packet with the data in the packet buffer for a next given script entry in the packet editing script.

14. The system of claim 13 wherein the determining whether the given script entry is the last script entry in the packet editing script, the control module:

determines whether an end of table (EOT) indicator in the given script entry indicates that the given script entry is the last script entry in the packet editing script.

15. A non-transitory computer-readable storage medium having embodied thereon a program, the program being executable by a processor to perform a method, the method comprising:

receiving a packet editing script comprising one or more script entries indicating modifications to be applied to a data packet and a data block comprising data for the modified packet;

for each given script entry in the packet editing script, copying data in the data block at a location and a size identified in the given script entry into a packet buffer; and generating a modified data packet with the data in the packet buffer, wherein copying data in the data block at a location and a size identified in the given script entry into a packet buffer comprises:

retrieving the given script entry of the packet editing script;

determining whether the given script entry is a first script entry for the modified data packet;

in response to determining that the given script entry is the first script entry for the modified data packet, reserving the packet buffer for the modified data packet;

copying the data in the data block at a block location and with a block length identified in the given editing script into the packet buffer;

determining whether the given script entry is a last script entry for the modified data packet; and in response to determining that the given script entry is not the last script entry for the modified data packet, performing the copy of the data in the data block at a block location and with a block length identified in the given editing script into the packet buffer and the determining whether the given script entry is a last script entry for the modified data packet for the next given script entry of the packet editing script.

16. The storage medium of claim 15 wherein the determining whether the given script entry is a first script entry for the modified data packet comprises:

determining whether a start of packet (SOP) indicator in the given script entry indicates that the given script entry is the first script entry for the modified data packet.

17. The storage medium of claim 15 wherein the determining whether the given script entry is a last script entry for the modified data packet comprises:

determining whether an end of packet (EOP) indicator in the given script entry indicates that the given script entry is the last script entry for the modified data packet.

18. The storage medium of claim 15 wherein the reserving and the copying the data in the data block at a block location and with a block length identified in the given editing script into the packet buffer are configured to:

set a packet buffer marker at a beginning of the packet buffer;

append a copy of the data in the data block at the block location and with the block length identified in the given editing script to the packet buffer at the packet buffer marker; and modify the packet buffer marker by the block length identified in the given editing script.

19. The storage medium of claim 15 wherein the generating comprises:
- in response to determining that the given script entry is the last script entry for the modified data packet, generating the modified data packet with the data in the packet buffer.

20. The storage medium of claim 19 wherein the generating further comprises:
- determining whether the given script entry is the last script entry in the packet editing script; and
- in response to determining that the given script entry is not the last script entry in the packet editing script, repeat the retrieving, the determining whether the given script entry is a first script entry, the reserving, the copying the data in the data block at a block location and with a block length identified in the given script entry into the packet buffer, the
- determining whether the given script entry is a last script entry, the performing, and generating the modified data packet with the data in the packet buffer for a next given script entry in the packet editing script.

21. The storage medium of claim 20 wherein the determine is configured to:
- determine whether an end of table (EOT) indicator in the given script entry indicates that the given script entry is the last script entry in the packet editing script.

* * * * *